United States Patent [19]

Wengrovius et al.

[11] Patent Number: 6,057,405
[45] Date of Patent: *May 2, 2000

[54] SILICONE CONTACT ADHESIVE COMPOSITIONS

[75] Inventors: Jeffrey H. Wengrovius, Scotia; Julie L. Dietz, Clifton Park, both of N.Y.

[73] Assignee: General Electric Company, Pittsfield, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/654,376

[22] Filed: May 28, 1996

[51] Int. Cl.[7] .................................................. C09J 183/06
[52] U.S. Cl. .......................... 525/477; 524/588; 524/268
[58] Field of Search ............................. 525/477; 524/268, 524/588

[56] References Cited

U.S. PATENT DOCUMENTS

| | | |
|---|---|---|
| 3,983,298 | 9/1976 | Hahn et al. ............................. 428/355 |
| 4,774,297 | 9/1988 | Murakami et al. ...................... 525/478 |
| 4,988,779 | 1/1991 | Medford et al. ......................... 525/478 |
| 5,026,766 | 6/1991 | Sasaki ..................................... 524/588 |
| 5,169,727 | 12/1992 | Boardman ............................... 428/447 |
| 5,190,827 | 3/1993 | Lin ......................................... 428/447 |
| 5,292,586 | 3/1994 | Lin et al. ................................ 428/355 |

FOREIGN PATENT DOCUMENTS

| | | |
|---|---|---|
| 0 183 379 | 6/1986 | European Pat. Off. . |
| 0191261 | 8/1986 | European Pat. Off. . |
| 0255226 | 2/1988 | European Pat. Off. . |
| 0 537 784 | 4/1993 | European Pat. Off. . |
| 0537784A | 4/1993 | European Pat. Off. . |
| 537 784 | 4/1993 | European Pat. Off. . |
| 2 277 933 | 11/1994 | United Kingdom . |
| 2 287 034 | 9/1995 | United Kingdom . |

*Primary Examiner*—Margaret G. Moore
*Attorney, Agent, or Firm*—Kenneth S. Wheelock; Michelle Bugbee

[57] ABSTRACT

Silicone contact adhesives comprising a high viscosity substantially linear polyorganosiloxane, an MQ resin, a coupling agent and solvent, method of making and method of using are disclosed. This composition is neither hydrosilation nor peroxide cured.

12 Claims, No Drawings

SILICONE CONTACT ADHESIVE COMPOSITIONS

FIELD OF THE INVENTION

The present invention relates to silicone compositions useful as contact adhesives. The silicone contact adhesives of the present invention are comprised of an MQ resin, a gum and a coupling agent dissolved in a volatile, non-aromatic solvent.

BACKGROUND OF THE INVENTION

Silicone pressure sensitive adhesives have excellent adhesive strength, tack, and cohesive strength, which are generally the properties required of a pressure sensitive adhesive. Silicone PSA tapes are used in many high temperature and chemically harsh industrial operations, such as plater's masking tapes, high shear splicing tapes, plasma and flame spraying, and the like. In order to be useful in these types of applications, silicone PSA's must exhibit high lap shear strength, particularly at elevated temperatures.

The term "pressure sensitive adhesives" (PSA) as used herein refers to adhesives that can be adhered to a surface and yet can be stripped from the surface without transferring more than trace quantities of adhesive to the surface, and can be re-adhered to the same or another surface because the adhesive retains some or all of its tack and adhesive strength.

A drawback associated with currently available silicone PSA's is the lack of high solids content with improved lap strength in combination with high peel and tack, especially at high temperatures. Presently there are no silicone PSA's which can demonstrate such adhesive properties without the presence of solvents. In geographic areas in which there are stringent air quality control regulations, the use of aromatic solvents in PSA's are subject to stringent regulation which effectively prohibits their use.

High solids silicone compositions capable of curing to form pressure sensitive adhesive compositions are known in the art, but these known compositions do not provide sufficient adhesive properties for demanding applications.

U.S. Pat. No. 5,169,727 (Boardman) is directed to a pressure sensitive adhesive composition having high solids content comprising (a) a benzene soluble resinous copolymer consisting of R'R''R'''SiO$_{1/2}$ units, SiO$_{4/2}$ units and containing silicon-bonded hydroxyl radicals ranging from 1 to 4 percent by weight of the copolymer, (b) a diorganoalkenylsiloxy end-blocked polydiorganosiloxane, (c) a diorganohydrogensiloxy end-blocked polydiorganosiloxane, (d) a crosslinking agent, and (e) a hydrosilylation catalyst. Boardman requires an organosiloxane crosslinker having 1 to 15 silicone atoms. Further, the examples presented in Boardman show the pressure sensitive adhesives prepared had low to moderate tack properties. The adhesive strength ranged from poor to passing as measured by holding power at 70° C. There is no teaching of a PSA with improved lap shear properties, no teaching of improved lap shear properties at high temperature, and no teaching of obtaining useful pressure sensitive adhesive properties at SiH/Si-Vinyl ratios of greater than 1.25:1.

U.S. Pat. No. 3,983,298 (Hahn et al.) is directed to a composition useful as a pressure sensitive adhesive, obtained by mixing components consisting essentially of (a) from 50 to 60 parts by weight of a solid, benzene soluble resin copolymer consisting essentially of R$_3$SiO$_{1/2}$ units and SiO$_{4/2}$ units, (b) from 40 to 50 parts by weight of an essentially cyclic free vinyl-terminated polydiorganosiloxane having a viscosity of from 20,000 to 100,000 centipoise at 25° C., (c) a hydrogen-containing organopolysiloxane in an amount sufficient to provide from 1.0 to 20.0 silicon-bonded hydrogen atoms for every olefinically unsaturated radical in the total of (a) plus (b) and (d) a platinum catalyst It is pointed out in Hahn that compositions of the prior art containing MQ resins mixed with low viscosity polydiorganosiloxanes do not form PSA's.

U.S. Pat. No. 4,774,297 (Murakami et al..) is directed to a composition suitable for forming a pressure sensitive adhesive having excellent tack and adhesive strength comprising (A) 30–70 parts by weight of a vinyl-terminated polydiorganosiloxane having a viscosity of at least 500,000 centipoise at 25° C., (B) 70–30 parts by weight of an organopolysiloxane containing R$_3$SiO$_{1/2}$ units and SiO$_{4/2}$ units, (C) an organohydrogensiloxane in an amount sufficient to provide 1–20 silicon-bonded hydrogen atoms per alkenyl group, (D) a platinum-containing catalyst, and (E) from 25–400 parts by weight of an organic solvent. In order to obtain a satisfactory product, Murakami et al.. teach that it is essential that the vinyl polymer have a viscosity of at least 500,000 centipoise and preferably at least one million centipoise at 25° C.

U.S. Pat. No. 4,988,779 (Medford et al.) discloses a composition suitable for forming a pressure sensitive adhesive, the composition having a solvent content of no more than 5–10% by weight and comprising from 30 to 50 parts of a vinyl-containing polydiorganosiloxane fluid having a viscosity of from 500 to 10,000 centipoise at 25° C., from 50 to 70 parts of a benzene soluble resin copolymer containing R$_3$SiO$_{1/2}$ units and SiO$_{4/2}$ units, an organopolysiloxane having silicon bonded hydrogen atoms, and a platinum catalyst The hydrogen-containing organopolysiloxane of the formula R$^3_a$H$_b$SiO$_{(4-a-b)/2}$, is present in an amount sufficient to provide from 1.0 to 30.0 silicon-bonded hydrogen atoms for every olefinically unsaturated radical in the composition. The hydrogen-containing organopolysiloxane functions as a cross-linker and has a small structure with a=1.00 to less than 2.00, b=0.05–1.00, a+b=1.10 to less than 3.00. There is no teaching of using higher molecular weight hydride crosslinker to give better peel and tack properties. The peel adhesion of the cured adhesive was controlled by controlling the amount of MQ resin and not by the crosslinker. There is no teaching of obtaining high lap shear strength in combination with high peel and tack adhesive properties.

U.S. Pat. No. 5,190,827 (Lin) is directed to a composition having high solids content and having a hydrogen-containing polydiorganosiloxane containing more than 2 silicon-bonded hydrogen atoms per chain. Other components in the composition include an MQ resin, an alkenyl-terminated silicone fluid, and a hydride-terminated silicone fluid. The cross linking that occurs is only through the hydride crosslinker which is selected from linear or resinous siloxane polymers, and no organosiloxane containing more than 2 silicon-bonded alkenyl groups as a crosslinker is disclosed.

U.S. Pat. No. 5,292,586 (Lin et al.) discloses a composition comprising a silanol-containing MQ resin, an alkenyl-terminated polydiorganosiloxane, a hydride-terminated organohydrogenpolysiloxane and a catalytic amount of a hydrosilylation catalyst. The composition cures to form a PSA having high peel and tack adhesion properties, but does not contain any cross linker or multifunctional alkenyl or multifunctional hydride silicones. The terminal hydride adhesive network reacts with silanol of the MQ resin to form an internally cured adhesive network.

U.S. patent application Ser. No. 08/150,570 (now abandoned) discloses an addition cured adhesive composition having high solids content. The composition is prepared from a multifunctional vinyl-containing silicone as crosslinker, in addition to MQ resin, an alkenyl-terminated silicone fluid, a hydride-terminated silicone fluid and a hydrosilylation catalyst. The cross-linking occurs through the external vinyl-crosslinker and forms the cured pressure sensitive adhesive. There is no teaching of preparing PSA's with improved lap shear strength in combination with high peel and tack adhesive properties.

While it has continued to be desirable to provide high solids polydiorganosiloxane compositions which cure to yield silicone pressure sensitive adhesives having high solids content and improved lap shear properties, particularly at elevated temperatures, low temperature uses that do not activate the curing reaction have been foreclosed because the conventional addition cure formulations do not cure well at low temperatures.

Pressure sensitive adhesives cure by hydrosilation of an olefinically unsaturated siloxane with a hydrogen containing siloxane, or by a free radical initiated polymerization, or by a combination of the two. Thus the pressure sensitive adhesives of the prior art typically contain a curing agent of some type either a noble metal hydrosilylation catalyst or a peroxide free radical generating compound. Pressure sensitive adhesives that cure by a combination cure will contain both types of catalysts.

SUMMARY OF THE INVENTION

We now disclose an adhesive composition comprising a silicone or mixture thereof that does not cure by either a free radical initiated polymerization or a molecularly catalyzed hydrosilylation reaction but rather cures by evaporation of a solvent.

Thus the present invention provides for a silicone contact adhesive comprising:
(A) from about 30 to about 50 parts by weight of a substantially linear polyorganosiloxane having the formula:

$$MD_xD'_yT_wQ_zM'$$

where $$M = R^1R^2R^3SiO_{1/2};$$

$$M' = R^8R^9R^{10}SiO_{1/2};$$

$$D = R^4R^5SiO_{2/2};$$

$$D' = R^6R^7SiO_{2/2};$$

$$T = R^{11}SiO_{3/2};$$

where $R^1$, $R^2$, $R^3$, $R^4$, $R^5$, $R^6$, $R^7$, $R^8$, $R^9$, $R^{10}$ and $R^{11}$ are independently selected from monovalent alkyl hydrocarbon radicals having from one to forty carbon atoms or monovalent aromatic hydrocarbon radicals having from six to forty carbon atoms; and $$Q = SiO_{4/2},$$

where (z+w)/(w+x+y+z) is less than 0.05 and x is positive and chosen whereby the viscosity of said substantially linear polyorganosiloxane is at least 500,000 centipoise at 25° C.; and
(B) from about 50 to 70 parts by weight of an MQ resin having the formula:

$$M''_aQ_b$$

where Q is as previously defined and M" is defined as:

$$M'' = R^{12}R^{13}R^{14}SiO_{1/2}$$

where $R^{12}$, $R^{13}$, and $R^{14}$ are selected from monovalent alkyl hydrocarbon radicals having from one to forty carbon atoms or monovalent aromatic hydrocarbon radicals having from six to forty carbon atoms with the subscript a ranges from about 0.5 to about 2.0 and the subscript b ranges from about 0.5 to about 2.0 wherein the sum of the components (A) and (B) sums to one hundred parts by weight.

The present invention further provides for a silicone contact adhesive additionally comprising a solvent. The present invention also further provides for a silicone contact adhesive comprising a coupling agent.

There is additionally provided a method of assembling articles of manufacture using the silicone contact adhesive of the present invention comprising
(a) applying to a first apparatus the silicone contact adhesive of the present invention; thereby
(b) forming a layer of said silicone contact adhesive upon said first apparatus; and
(c) contacting said layer of silicone contact adhesive with a second apparatus, thereby
(d) assembling an article of manufacture.

The present invention further provides a method of making the silicone contact adhesive of the present invention.

DETAILED DESCRIPTION OF THE INVENTION

The adhesive compositions of the present invention comprise a high viscosity polydiorganosiloxane, typically materials known in the art as gums and an MQ resin. Additionally such material may also comprise a coupling agent as well as a solvent.

The silicone contact adhesives of the present invention comprise:

(A) from about 30 to about 50 parts by weight of a substantially linear polyorganosiloxane having the formula:

$$R^1R^2R^3SiO(R^4R^5SiO)_x(R^6R^7SiO)_ySiR^8R^9R^{10}$$

where $R^1$, $R^2$, $R^3$, $R^4$, $R^5$, $R^6$, $R^7$, $R^8$, $R^9$, and $R^{10}$ are selected from monovalent alkyl hydrocarbon radicals having from one to forty carbon atoms or monovalent aromatic hydrocarbon radicals having from six to forty carbon atoms, preferably from monovalent alkyl hydrocarbon radicals having from one to eight carbon atoms or monovalent aromatic hydrocarbon radicals having from six to eight carbon atoms, more preferably from monovalent alkyl hydrocarbon radicals having from one to six carbon atoms or monovalent aromatic hydrocarbon radicals having from six to seven carbon atoms, and most preferably from methyl, ethyl, n-propyl, iso-propyl, n-butyl, iso-butyl, sec-butyl, t-butyl or phenyl; where x is greater than zero and the sum of x+y is sufficiently large that the viscosity of the linear siloxane is at least 500,000 centipoise (cps) at 25° C., preferably greater than 1,000,000 cps at 25° C., more preferably greater than 3,000,000 cps at 25° C., and most preferably greater than 5,000,000 cps at 25° C. A substantially linear polyorganosiloxane encompasses polyorganosiloxanes having the formula:

$MD_x D'_y T_w Q_z M'$ where $M = R^1 R^2 R^3 SiO_{1/2}$;

$M' = R^8 R^9 R^{10} SiO_{1/2}$;

$D = R^4 R^5 SiO_{2/2}$;

$D' = R^6 R^7 SiO_{2/2}$;

$T = R^{11} SiO_{3/2}$;

$R^{11}$ being selected from monovalent alkyl hydrocarbon radicals having from one to forty carbon atoms or monovalent aromatic hydrocarbon radicals having from six to forty carbon atoms, preferably from monovalent alkyl hydrocarbon radicals having from one to eight carbon atoms or monovalent aromatic hydrocarbon radicals having from six to eight carbon atoms, more preferably from monovalent alkyl hydrocarbon radicals having from one to six carbon atoms or monovalent aromatic hydrocarbon radicals having from six to seven carbon atoms, and most preferably from methyl, ethyl, n-propyl, iso-propyl, n-butyl, iso-butyl, sec-butyl, t-butyl or phenyl; and $Q = SiO_{4/2}$, where $(z+w)/(w+x+y+z)$ is less than 0.05, preferably less than 0.01, more preferably less than 0.005, and most preferably less than 0.001.

Due to the methods of manufacture of these substantially linear polyorganosiloxane gums, the terminal groups, M and M', frequently contain some quantity of hydroxyl substituents so that $R^1$ and $R^8$ are hydroxyl in a very small weight percent of the preparation. The formulas recited above are thus idealizations of a perfect synthetic process where no hydroxyl by-product would be manufactured. Applicants define trace to be any amount below 0.01 weight percent, thus a trace amount of hydroxyl, i.e. below 0.01 weight percent, may be present in the substantially linear polyorganosiloxanes of component (A).

Applicants note that while the compositions of the present invention neither cure by hydrosilylation nor by peroxide initiated free radical polymerization that some of the alkyl substituents $R^2$, $R^3$, $R^4$, $R^5$, $R^6$, $R^7$, $R^9$, $R^{10}$ and $R^{11}$ could be substituted with monovalent alkylene radicals without rendering the composition curable by these two methods.

(B) From about 50 to 70 parts by weight of an MQ resin having the formula:

$M''_a Q_b$ where Q is as previously defined and M" is defined as:

$M'' = R^{12} R^{13} R^{14} SiO_{1/2}$ where $R^{12}$, $R^{13}$, and $R^{14}$ are selected from monovalent alkyl hydrocarbon radicals having from one to forty carbon atoms or monovalent aromatic hydrocarbon radicals having from six to forty carbon atoms, preferably from monovalent alkyl hydrocarbon radicals having from one to eight carbon atoms or monovalent aromatic hydrocarbon radicals having from six to eight carbon atoms, more preferably from monovalent alkyl hydrocarbon radicals having from one to six carbon atoms or monovalent aromatic hydrocarbon radicals having from six to seven carbon atoms, and most preferably from methyl, ethyl, n-propyl, iso-propyl, n-butyl, iso-butyl, sec-butyl, t-butyl or phenyl where the subscript a ranges from about to 0.5 to about 2.0, preferably from about 0.5 to about 1.5, more preferably from about 0.55 to about 1.2, and most preferably from about 0.6 to about 0.9; and the subscript b ranges from about to 0.5 to about 2.0, preferably from about 0.6 to about 1.5, more preferably from about 0.75 to about 1.25, and most preferably from about 0.9 to about 1.1.

It is desirable that the MQ ($M''_a Q_b$) resin comprise from about 0.01 to about 10.0 weight percent hydroxyl groups, preferably from about 0.05 to about 8.0 weight percent hydroxyl groups, more preferably from about 0.10 to about 6.0 weight percent hydroxyl groups, and most preferably from about 0.20 to about 3.0 weight percent hydroxyl groups, and that these hydroxyls are attached to the Q of the MQ resin.

Applicants note that while the compositions of the present invention neither cure by hydrosilylation nor by peroxide initiated free radical polymerization that some of the alkyl substituents $R^{12}$, $R^{13}$, and $R^{14}$ could be substituted with monovalent alkylene radicals without rendering the composition curable by these two methods.

Applicants note that resins comparable in function to the $M''_a Q_b$ resin recited could be substituted in these preparations by preparing a resin of the general formula $M''_a D_r T_s Q_b$ where D and T are as previously defined and the subscripts r and s are very much smaller than a and b so that $((r+s)/(a+b+r+s))$ is less than 0.3.

The sum of components (A) and (B) is one hundred parts by weight.

(C) an effective amount of a coupling agent having the formula:

$R^{15}{}_2 Si(NR^{16}{}_2)_2$ where $R^{15}$ and $R^{16}$ are selected from monovalent alkyl hydrocarbon radicals having from one to forty carbon atoms or monovalent aromatic hydrocarbon radicals having from six to forty carbon atoms, preferably from monovalent alkyl hydrocarbon radicals having from one to eight carbon atoms or monovalent aromatic hydrocarbon radicals having from six to eight carbon atoms, more preferably from monovalent alkyl hydrocarbon radicals having from one to six carbon atoms or monovalent aromatic hydrocarbon radicals having from six to seven carbon atoms, and most preferably from methyl, ethyl, n-propyl, iso-propyl, n-butyl, iso-butyl, sec-butyl, t-butyl or phenyl. An effective amount of the coupling agent ranges from about 0.001 to about 5.0 parts by weight per hundred parts by weight of (A) and (B), preferably from about 0.005 to about 3.0 parts by weight, more preferably from about 0.01 to about 1.5 parts by weight, and most preferably from about 0.02 to about 1.0 parts by weight.

An alternative choice for the coupling agent are compounds having the formula:

$(R^{17} R^{18} N(CH_2)_p) SiR^{19}{}_c (OR^{20})_{3-c}$ where $R^{17}$ and $R^{18}$ are selected from the group consisting of hydrogen, monovalent alkyl hydrocarbon radicals having from one to 40 carbon atoms and monovalent alkylene hydrocarbon radicals having from two to forty carbon atoms, $R^{19}$ and $R^{20}$ are selected from the group consisting of monovalent alkyl hydrocarbon radicals having from one to 40 carbon atoms and monovalent alkylene hydrocarbon radicals having from two to forty carbon atoms, where the subscript p ranges from 1 to 10 with c either 0 or 1.

(D) From about 10 to about 2,000 parts by weight based on 100 parts by weight of (A) and (B), i.e. the sum by weight of (A) and (B) is one hundred parts by weight, of a volatile solvent or mixture of solvents. Preferably the solvent is non-aromatic. Because the adhesive properties of the silicone contact adhesive composition develop as the solvent evaporates, the selection of a solvent is highly dependent on the boiling point of the solvent. It is desirable to have a solvent that has a boiling point below 250° C., preferably below 200° C., more preferably below 150° C., and most preferably below 125° C. Preferred solvents include low boiling hydrocarbons such as methyl cyclopentane, cyclohexane, hexane, heptane, octane and mixtures of isomeric pentanes, hexanes, heptanes, octanes, cycloaliphatics and the like.

The silicone contact adhesives of the present invention necessarily comprise a high viscosity substantially linear polyorganosiloxane and an MQ resin but may optionally contain a coupling agent and a solvent or solvent mixtures. An important feature of these compositions is that they will wet and bind to materials that have a low surface energy such as silicone rubbers. By way of example, a silicone contact adhesive of the present invention is applied to an aluminum automobile part that requires a gasket for sealing when the aluminum part is mated or joined to another automobile part. A silicone rubber gasket is placed in contact with the aluminum automobile part that has been coated with the silicone contact adhesive of the present invention and the gasket is immediately and directly bonded to the aluminum part. Because of the rapidity with which bonding occurs when the silicone contact adhesive is used, the formulation is particularly suited to robotic assembly of metal parts that require rubber or silicone rubber gaskets.

In general the composition of the present invention may be used to affix materials having a low surface energy to other materials thereby effecting a method of assembly. The process is broadly conceived to involve a method of applying the silicone contact adhesive of the present invention to a first apparatus, forming either a localized or extensive layer of the silicone contact adhesive upon said first apparatus and affixing thereto a second apparatus or article thereby assembling a third apparatus comprising the first apparatus, the second apparatus and the silicone contact adhesive of the present invention whereby contact is maintained between the first and second apparatus by means of the silicone contact adhesive of the present invention.

All United States patents referenced herein are herewith and hereby specifically incorporated by reference.

EXPERIMENTAL

Three silicone contact adhesives were prepared by blending the solvent, the substantially linear organopolysiloxane and the MQ resin until a homogeneous solution was obtained. The coupling agent, dimethylbis(di-iso-propyl amino)silane, was then added with stirring. The ingredients are shown in Table 1.

TABLE 1

Silicone Contact Adhesive Formulations

| Formulation | 1 | 2 | 3 |
|---|---|---|---|
| Component, parts by weight substantially linear polyorgano-siloxane[1] | 43 | 43 | 43 |
| $M_aQ_b$, a = 0.65, b = 1.0[2] | 57 | 57 | 57 |
| solvent, at a constant 150 parts by weight | iso-octane | hexamethyl-disiloxane (MM) | hexane |
| coupling agent, $(CH_3)_2Si(N(C_3H_7)_2)_2$ | 0.05 | 0.05 | 0.05 |

Notes to Table 1:
[1]The substantially linear polyorganosiloxane used contained approximately 13.8 mole % diphenylsiloxane groups and 86.2 dimethylsiloxane groups, with the terminal M groups having the formula $(CH_3)_2(OH)SiO_{1/2}$ and had a viscosity of 100,000,000 centipoise at 25° C.
[2]The M of the $M_aQ_b$ resin had the formula with a = 0.65 and b = 1.0 with an hydroxyl content of 2.0 weight percent.

The silicone contact adhesives having the compositions summarized in Table 1 were analyzed for viscosity, tack, peel adhesion, and lap shear. The results are presented in Table 2.

TABLE 2

Physical Properties of Silicone Contact Adhesives

| Formulation | Solvent | Viscosity, centistokes at 25° C. | Tack, (g/cm$^2$) | Peel Adhesion, (oz./in.) | Lap Shear, hrs. |
|---|---|---|---|---|---|
| 1 | iso-octane | 1832 | 706 | 47 | 23.7 |
| 2 | MM | 1352 | 883 | 52 | >24 |
| 3 | hexane | 704 | 614 | 52 | >24 |

The viscosity testing was performed at 25° C. using calibrated Ostwald viscometer tubes.

The tack, peel adhesion and lap shear were measured by preparing a film coated with the silicone contact adhesives of the present invention. A 1 mil thick Mylar™ polyester film was knife coated with the silicone contact adhesive of interest to a coating thickness of 2 mils. The solvent was allowed to evaporate for 15 minutes and then the coated film was hung in a 90° C. oven for 24 hours. The adhesive coating thickness after solvent evaporation was 1 mil. Probe tack was measured using a Probe Tack Tester available from TMI, Inc. of Amityville, N.Y. The peel adhesion was measured at a 180 degree peel angle at a rate of 12 in./min. against a steel plate. The lap shear was determined by laminating a 1"×1" piece of the coated polyester tape against a steel test panel and suspending a 500 g dead weight at the other end of the tape strip and measuring the time to failure.

Four additional silicone contact adhesives were prepared using differing levels of the dimethylbis(di-iso-propyl amino)silane coupling agent as shown in Table 3.

TABLE 3

Silicone Contact Adhesive Formulations having Variable Levels of Coupling Agent

| Formulation | 4 | 5 | 6 | 7 |
|---|---|---|---|---|
| Component, parts by weight substantially linear polyorgano-siloxane[1] | 43 | 43 | 43 | 43 |
| $M_aQ_b$, a = 0.65, b = 1.0[2] | 57 | 57 | 57 | 57 |
| hexane solvent | 150 | 150 | 150 | 150 |
| coupling agent, $(CH_3)_2Si(N(C_3H_7)_2)_2$ | 0 | 0.05 | 0.125 | 0.250 |

Notes to Table 3:
[1]The substantially linear polyorganosiloxane used contained approximately 13.8 mole % diphenylsiloxane groups and 86.2 dimethylsiloxane groups, with the terminal M groups having the formula $(CH_3)_2(OH)SiO_{1/2}$ and had a viscosity of 100,000,000 centipoise at 25° C.
[2]The M of the $M_aQ_b$ resin had the formula with a = 0.65 and b = 1.0 with an hydroxyl content of 2.0 weight percent.

The silicone contact adhesive formulations as shown in Table 3 were evaluated for their physical properties which are shown in Table 4 to determine the effect of the coupling agent concentration on the physical properties.

TABLE 4

Physical Properties of Silicone Contact Adhesives

| Formulation (hexane solvent) | Coupling Agent Parts by Weight | Viscosity centistokes at 25° C. | Tack, (g/cm$^2$) | Peel Adhesion, (oz./in.) | Lap Shear hrs. |
|---|---|---|---|---|---|
| 4 | 0 | 507 | 773 | 76 | 4.1 |
| 5 | 0.05 | 704 | 614 | 52 | >24 |
| 6 | 0.125 | 647 | 610 | 45 | >24 |
| 7 | 0.250 | 615 | 576 | 52 | >24 |

These results indicate that a coupling agent has a beneficial effect on the lap shear property of a silicone contact adhesive where the physical properties of the adhesive develop primarily by evaporation of the solvent.

The variation in physical properties were measured as a result of varying the amount of solvent present in the silicone contact adhesive. The formulations are shown in Table 5 and the physical properties are shown in Table 6.

TABLE 5

Silicone Contact Adhesive Formulations with Variations in the Solvent Content

| Formulation | 8 | 9 | 10 |
|---|---|---|---|
| Component, parts by weight | 43 | 43 | 43 |
| substantially linear polyorganosiloxane$^1$ | | | |
| M$_a$Q$_b$, a = 0.65, b = 1.0$^2$ | 57 | 57 | 57 |
| hexane solvent | 145 | 150 | 155 |
| coupling agent, (CH$_3$)$_2$Si(N(C$_3$H$_7$)$_2$)$_2$ | 0.05 | 0.05 | 0.05 |

Notes to Table 5:
$^1$The substantially linear polyorganosiloxane used contained approximately 13.8 mole % diphenylsiloxane groups and 86.2 dimethylsiloxane groups, with the terminal M groups having the formula (CH$_3$)$_2$(OH)SiO$_{1/2}$ and had a viscosity of 100,000,000 centipoise at 25° C.
$^2$The M of the M$_a$Q$_b$ resin had the formula with a = 0.65 and b = 1.0 with an hydroxyl content of 2.0 weight percent.

TABLE 6

Physical Properties of Silicone Contact Adhesives

| Formulation | Solvent Level, parts by weight | Viscosity, centistokes at 25° C. | Tack, (g/cm$^2$) | Peel Adhesion, (oz./in.) | Lap Shear, hrs. |
|---|---|---|---|---|---|
| 8 | 145 | 889 | 613 | 45 | >24 |
| 9 | 150 | 704 | 614 | 52 | >24 |
| 10 | 155 | 491 | 830 | 50 | >24 |

Formulation 8 had weight percent solids level of 41.4, formulation 9 a solids level of 40.2 weight percent, and formulation 10 a solids level of 37.8 weight percent.

Table 6 demonstrates the decreasing viscosity associated with increasing solvent level and the resultant effect on the physical properties.

What is claimed is:

1. A silicone contact adhesive comprising:
   (A) from about 30 to about 50 parts by weight of a polyorganosiloxane having the formula:

$MD_xD'_yT_wQ_zM'$ where $M=R^1R^2R^3SiO_{1/2}$;

$M'=R^8R^9R^{10}SiO_{1/2}$;

$D=R^4R^5SiO_{2/2}$;

$D'=R^6R^7SiO_{2/2}$;

$T=R^{11}SiO_{3/2}$;

where $R^1$, $R^2$, $R^3$, $R^4$, $R^5$, $R^6$, $R^7$, $R^8$, $R^9$, $R^{10}$ and $R^{11}$ are selected from monovalent alkyl hydrocarbon radicals having from one to forty carbon atoms or monovalent aromatic hydrocarbon radicals having from six to forty carbon atoms; and $Q=SiO_{4/2}$, where (z+w)/(w+x+y+z) is less than 0.05 and x is positive and chosen whereby the viscosity of said polyorganosiloxane is at least 500,000 centipoise at 25° C. and w, y and z are zero or positive;
   (B) from about 50 to 70 parts by weight of an MQ resin having the formula:

$M''_aQ_b$ where Q is as previously defined and M" is defined as:

$M''=R^{12}R^{13}R^{14}SiO_{1/2}$ where $R^{12}$, $R^{13}$, and $R^{14}$ are selected from monovalent alkyl hydrocarbon radicals having from one to forty carbon atoms or monovalent aromatic hydrocarbon radicals having from six to forty carbon atoms wherein the subscript a ranges from 0.6 to 0.9 and the subscript b ranges from 0.9 to about 1.1 wherein the sum of (A) and (B) sums to one hundred parts by weight wherein Q of resin (B) comprises from about 0.01 to about 10.0 weight percent hydroxyl groups; and
   (C) a non-aromatic solvent with a boiling point less than 125° C., and (D) a coupling agent; wherein the composition is not curable by hydroxilylation or by peroxide inititated free radical polymerization, and it cures by evaporation of the solvent.

2. The composition of claim 1 wherein said solvent ranges from about 10 to about 2,000 parts by weight based on 100 parts by weight of (A) and (B).

3. The composition of claim 1 wherein the coupling agent is selected from the group consisting of:

$R^{15}{}_2Si(NR^{16}{}_2)_2$ where $R^{15}$ and $R^{16}$ are selected from monovalent alkyl hydrocarbon radicals having from one to forty carbon atoms or monovalent aromatic hydrocarbon radicals having from six to forty carbon atoms and $(R^{17}R^{18}N(CH_2)_p)SiR^{19}{}_c(OR^{20})_{3-c}$ where $R^{17}$ and $R^{18}$ are selected from the group consisting of hydrogen, monovalent alkyl hydrocarbon radicals having from one to 40 carbon atoms and monovalent alkylene hydrocarbon radicals having from two to forty carbon atoms, $R^{19}$ and $R^{20}$ are selected from the group consisting of monovalent alkyl hydrocarbon radicals having from one to 40 carbon atoms and monovalent alkylene hydrocarbon radicals having from two to forty carbon atoms, where the subscript p ranges from 1 to 10 with c either 0 or 1.

4. The composition of claim 3 wherein said coupling agent ranges in amount from about 0.001 to about 5.0 parts by weight per hundred parts by weight of (A) and (B).

5. The composition of claim 4 wherein $R^1$, $R^2$, $R^3$, $R^4$, $R^5$, $R^6$, $R^7$, $R^8$, $R^9$, $R^{10}$ and $R^{11}$ are methyl.

6. The composition of claim 4 wherein $R^5$ and $R^6$ are phenyl.

7. The composition of claim 6 wherein said coupling agent is dimethylbis(di-iso-propyl amino)silane.

8. The composition of claim 7 wherein said solvent is hexane.

9. The composition of claim 7 wherein said solvent is hexamethyldisiloxane.

10. The composition of claim 7 wherein said solvent is iso-octane.

11. A silicone contact adhesive consisting essentially of:

(A) from about 30 to about 50 parts by weight of a polyorganosiloxane having the formula:

$$MD_xD'_yT_wQ_zM'$$

where $$M=R^1R^2R^3SiO_{1/2};$$

$$M'=R^8R^9R^{10}SiO_{1/2};$$

$$D=R^4R^5SiO_{2/2};$$

$$D'=R^6R^7SiO_{2/2};$$

$$T=R^{11}SiO_{3/2};$$

where $R^1$, $R^2$, $R^3$, $R^4$, $R^5$, $R^6$, $R^7$, $R^8$, $R^9$, $R^{10}$ and $R^{11}$ are selected from monovalent alkyl hydrocarbon radicals having from one to forty carbon atoms or monovalent aromatic hydrocarbon radicals having from six to forty carbon atoms; and $$Q=SiO_{4/2},$$

where $(z+w)/(w+x+y+z)$ is less than 0.05 and x is positive and chosen whereby the viscosity of said polyorganosiloxane is at least 500,000 centipoise at 25° C. and w, y and z are zero or positive;

(B) from about 50 to 70 parts by weight of an MQ resin having the formula:

$$M''_aQ_b$$

where Q is as previously defined and M" is defined as:

$$M''=R^{12}R^{13}R^{14}SiO_{1/2}$$

where $R^{12}$, $R^{13}$, and $R^{14}$ are selected from monovalent alkyl hydrocarbon radicals having from one to forty carbon atoms or monovalent aromatic hydrocarbon radicals having from six to forty carbon atoms wherein the subscript a ranges from 0.6 to 0.9 and the subscript b ranges from 0.9 to about 1.1 wherein the sum of (A) and (B) sums to one hundred parts by weight wherein Q of resin (B) comprises from about 0.01 to about 10.0 weight percent hydroxyl groups; and (C) a non-aromatic solvent with a boiling point less than 125° C., and (D) a coupling agent; wherein the composition is not curable by hydroxilylation or by peroxide inititated free radical polymerization, and it cures by evaporation of the solvent.

12. A method of preparing a silicone contact adhesive comprising:

(a) selecting a polyorganosiloxane having the formula:

$$MD_xD'_yT_wQ_zM'$$

where $$M=R^1R^2R^3SiO_{1/2};$$

$$M'=R^8R^9R^{10}SiO_{1/2};$$

$$D=R^4R^5SiO_{2/2};$$

$$D'=R^6R^7SiO_{2/2};$$

$$T=R^{11}SiO_{3/2};$$

where $R^1$, $R^2$, $R^3$, $R^4$, $R^5$, $R^6$, $R^7$, $R^8$, $R^9$, $R^{10}$ and $R^{11}$ are selected from monovalent alkyl hydrocarbon radicals having from one to forty carbon atoms or monovalent aromatic hydrocarbon radicals having from six to forty carbon atoms; and $$Q=SiO_{4/2},$$

where $(z+w)/(w+x+y+z)$ is less than 0.05 and x is positive and chosen whereby the viscosity of said polyorganosiloxane is at least 500,000 centipoise at 25° C. and w, y and z are zero or positive; and (b) selecting an MQ resin having the formula:

$$M''_aQ_b$$

where Q is as previously defined and M" is defined as:

$$M''=R^{12}R^{13}R^{14}SiO_{1/2}$$

where $R^{12}$, $R^{13}$, and $R^{14}$ are selected from monovalent alkyl hydrocarbon radicals having from one to forty carbon atoms or monovalent aromatic hydrocarbon radicals having from six to forty carbon atoms wherein the subscript a ranges from 0.6 to 0.9 and the subscript b ranges from 0.9 to about 1.1 wherein the sum of (A) and (B) sums to one hundred parts by weight wherein Q of resin (B) comprises from about 0.01 to about 10.0 weight percent hydroxyl groups;

(c) selecting a non-aromatic solvent with a boiling point of less than 125° C., and a coupling agent; and (d) blending said polyorganosiloxane, said MQ resin and said non-aromatic solvent and coupling agent together, wherein the composition is not curable by hydroxilylation or by peroxide initiated free radical polymerization, and it cures by evaporation of the solvent.

* * * * *